Aug. 18, 1953 C. W. HARRISON 2,649,508

INTERSTAGE COUPLING CIRCUIT FOR WIDE BAND AMPLIFIERS

Filed Nov. 12, 1948 2 Sheets-Sheet 1

INVENTOR
C. W. HARRISON

BY N. S. Ewing
ATTORNEY

Aug. 18, 1953 C. W. HARRISON 2,649,508

INTERSTAGE COUPLING CIRCUIT FOR WIDE BAND AMPLIFIERS

Filed Nov. 12, 1948 2 Sheets-Sheet 2

INVENTOR
C. W. HARRISON

BY N. S. Ewing
ATTORNEY

Patented Aug. 18, 1953

2,649,508

UNITED STATES PATENT OFFICE 2,649,508

INTERSTAGE COUPLING CIRCUIT FOR WIDE BAND AMPLIFIERS

Charles W. Harrison, Chatham, N. J., assignor to Bell Telephone Laboratories, Incorporated, New York, N. Y., a corporation of New York Application November 12, 1948, Serial No. 59,701

5 Claims. (Cl. 179—171)

This invention pertains generally to wide band vacuum tube amplifiers and its principal object is to reduce the gain-bandwidth limitations generally encountered in the design of such amplifiers.

Another and more particular object is to achieve as favorable as possible a distribution of parasitic capacitances in a wide band amplifier.

In a wide band amplifier, the product of gain and bandwidth is usually limited by the various parasitic capacitances appearing in the circuit. Under such circumstances, the power output of the amplifier cannot be increased without sacrificing bandwidth and, conversely, frequency coverage cannot be improved upon without a corresponding sacrifice of power output. It is, therefore, highly advantageous to achieve a more favorable distribution of the respective parasitic capacitances and thereby allow either increased gain or bandwidth, or a combination of both.

In the past, cathode followers have often been employed to achieve a favorable distribution of parasitic capacitances. Since triode cathode followers are at a disadvantage because of their plate current limitations, pentodes are generally used as power output circuits. The pentode cathode follower circuits known in the art, however, possess additional parasitic capacitances which serve greatly to reduce the advantageous redistribution of capacitances made possible by the cathode follower type of operation. The present invention, on the other hand, permits the advantages of cathode follower operation to be realized fully even if pentode or tetrode type tubes are used.

In an embodiment of the present invention, an alternating-current signal source is coupled between one of the control electrodes and the cathode circuit of a multi-electrode cathode follower, that control electrode being in turn coupled through a resistance-capacitance network to the other principal control electrode. A suitable direct operating voltage is supplied to these electrodes from an appropriate direct-current source and is of a magnitude that is determined by the voltage dividing action of the resistance in the above-mentioned resistance-capacitance network and an additional resistance coupled between the latter control electrode and the cathode circuit of the cathode follower. In this circuit parasitic capacitances are distributed in a relatively advantageous manner without the introduction of additional troublesome capacitances and gain-bandwidth limitations are reduced. In practice, as will be described later, the two mentioned control electrodes will usually be the screen and control grids, respectively, of a pentode tube, and the direct grid voltage will be furnished by the direct-current component of the plate or space current of a preceding vacuum tube.

A more thorough understanding of the invention may be obtained by a study of the following detailed description. In the drawings.

In order to achieve a broader background for a complete understanding of the present invention, a comparison with known prior art is helpful. For instance, it is often advantageous to employ a cathode follower as the final stage of a multi-stage vacuum tube amplifier. The cathode follower is generally used to obtain a low output impedance with little loading on the preceding stage. Since parasitic capacitance is usually the limiting parameter for the gain-bandwidth product in wide band amplifiers, the cathode follower also is desirable since it tends to redistribute such parasitic capacitances to advantage. Since the control grid of a cathode follower is at substantially the same alternating-current potential as the cathode, the stray capacitance appearing between the control grid and the cathode is eliminated. There are, however, certain difficulties which are encountered in broad band usage of the more conventional types of cathode followers.

Figure 1:
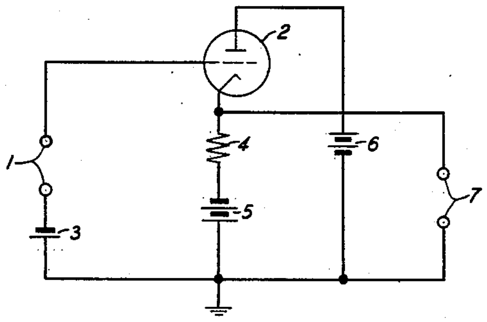
Figs. 1, 2 and 3 illustrate conventional types of cathode follower circuits for comparison purposes.

Fig. 1 is a schematic diagram of a typical triode cathode follower such as is common in the prior art. In Fig. 1, one of the input terminals 1 is connected to the control grid of the triode tube 2. The other input terminal 1 is connected to the negative side of a biasing battery 3, the positive side of which is grounded. A resistance 4 is connected between the cathode of tube 2 and the negative side of a power supply 5, and the positive side of a power supply 6 is connected to the plate of tube 2. The positive side of power supply 5 and the negative side of power supply 6 are grounded. Power supply 5, it will be noted, may be omitted in many applications. It has the advantage of permitting an increase in the direct-current resistance of cathode resistor 4. Output terminals 7 are connected between the cathode of tube 2 and ground.

The voltage appearing across output terminals 7 will, when the product of the transconductance of tube 2 and the impedance of cathode resistor 4 is appreciably greater than unity, approach the input signal in magnitude and be of the same phase. Since the output impedance of the cathode follower is considerably lower than the input impedance, there is a corresponding amplification in power. However, the triode cathode follower is at a disadvantage as a power output circuit since the plate current is limited by the plate to cathode potential for any given supply voltage. It is desirable to prevent the plate current of tube 2 from ever becoming zero, since the desirable properties of the cathode follower would disappear during any such interval.

Figure 2:
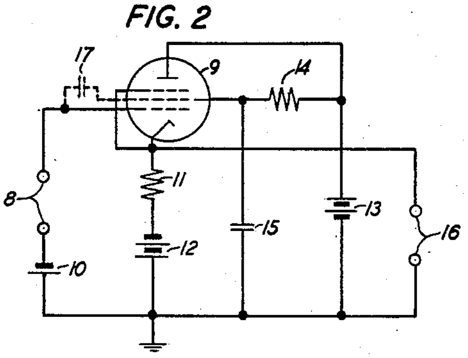

Fig. 2 shows an example from the prior art of a tube having pentode characteristics used as a cathode follower. In Fig. 2, one of the input terminals 8 is connected to the control grid of pentode tube 9. A grid biasing battery 10 is located between the other input terminal 8 and ground. The cathode of tube 9 is connected to one side of a resistance 11, the other side of which is connected through a negative direct-current power supply 12 to ground. The suppressor grid of tube 9 is coupled directly to the cathode of the same tube and a positive direct-current plate power supply 13 is connected between the plate of tube 9 and ground. The screen grid and the plate of tube 9 are connected through a dropping resistor 14 and the screen grid is bypassed to ground through a capacitance 15. The output terminals 16 are connected between the cathode of tube 9 and ground.

In the circuit of Fig. 2, the plate current of tube 9 is more nearly independent of the plate to cathode potential. However, with the screen by-pass capacitance 15 returned to ground, the capacitance 17 that exists between the screen and control grids of tube 9 has been effectively shunted across input terminals 8, thereby increasing the shunting capacitance across the load of the preceding stage. This reduces the overall gain or the bandwidth, depending upon the discretion of the designer. The shunting of input terminals 8 by capacitance 17 makes the circuit of Fig. 2 of little interest relative to broadband applications. In other words, capacitance 17 has reduced the effectivenes of the cathode follower to redistribute the interstage capacitances of a multistage amplifier to an advantage.

Figure 3:
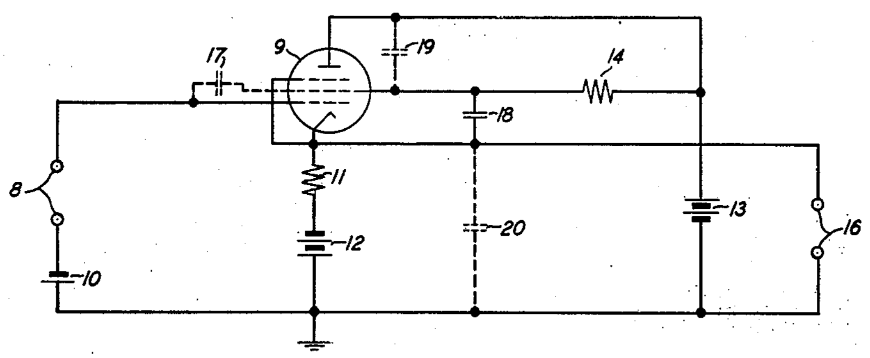

Fig. 3 represents essentially the same prior art circuit that was shown in Fig. 2, with the exception that a by-pass capacitance 18 is returned from the screen grid of tube 9 to the cathode rather than to ground. Circuit elements in Fig. 2 similar to those previously described in Fig. 2 are given like reference numerals.

Returning by-pass capacitance 18 to the cathode essentially removes the screen-control grid capacitance 17 from consideration, since the screen and control grids are at approximately the same potential for all frequencies where the product of the transconductance of tube 9 and the impedance of cathode resistor 11 is large in comparison with unity. When this condition is met the cathode "follows" the potential variations of the control grid. In other words, the cathode and the control grid maintain substantially equal potentials with respect to alternating-current. In Fig. 3 a new capacitance, the plate-screen grid capacitance 19 of tube 9, has been introduced across the input circuit 8 and is materially less than screen-control grid capacitance 17. However, a new capacitance 20 has been added across the output circuit 16. This capacitance 20 is the parasitic capacitance of screen by-pass condenser 18. Since for many applications, such as in video and base-band amplifiers, good low frequency response is a requisite, condenser 18 is large physically as well as electrically.

The effectiveness of capacitance 18 is also a function of the size of resistance 14. Hence, a larger value for resistance 14 enables the designer to use a smaller screen by-pass condenser 18. The magnitude of screen resistor 14, however, is limited by the voltage drop across it, which in power amplifier use, must be kept relatively small. Therefore, satisfactory low frequency response requires a large screen by-pass condenser 18, thus making stray capacitance 20 large and a serious consideration.

Figure 4:
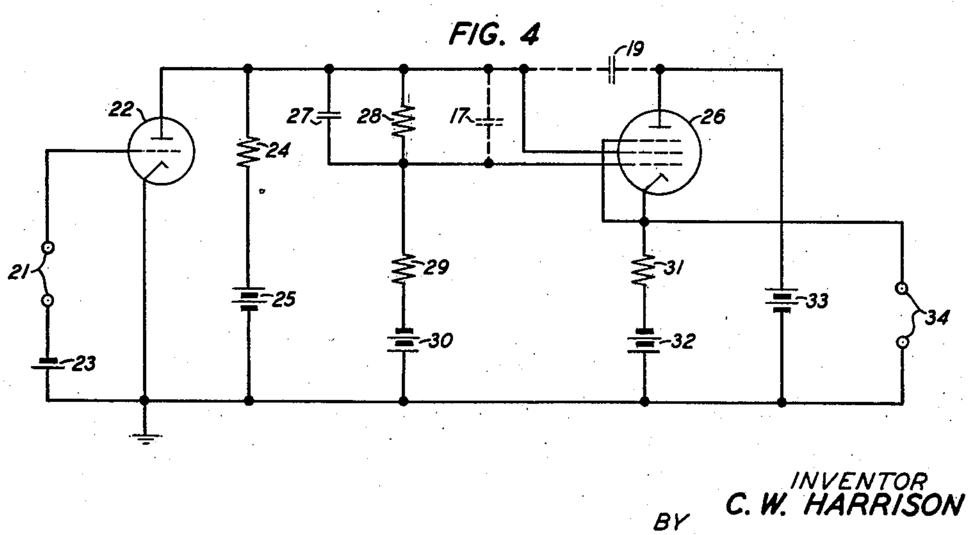
Fig. 4 represents an embodiment of the present invention.

A preferred embodiment of the present invention is illustrated in Fig. 4. There one of the input terminals 21 is coupled directly to the control grid of a triode tube 22. The other input terminal 21 is connected through a grid biasing battery 23 to ground. The cathode of tube 22 is grounded and its plate is connected through a resistance 24 to the positive side of a direct-current plate power supply 25. The negative side of plate supply 25 is grounded.

The plate of tube 22 is coupled directly to the screen grid of a pentode tube 26. A capacitance 27 and a resistance 28 are connected in parallel between the screen and control grids of tube 26, and a resistance 29 is connected between the control grid of tube 26 and the negative side of a direct-current power supply 30. The positive side of power supply 30 is grounded. The suppressor grid of tube 26 is coupled directly to the cathode, which is returned to ground through a resistance 31 and a negative direct-current source 32. The plate of tube 26 is returned to ground through a plate power supply 33. The output terminals 34 are connected between the cathode of tube 26 and ground. For many purposes a tetrode tube may be used in place of pentode tube 26, in which case, of course, no suppressor grid is involved.

The circuit of Fig. 4 incorporates many of the best features of the prior art circuits of Figs. 1, 2 and 3, while minimizing their disadvantages. The control grid of pentode tube 26 is coupled for alternating-current to the screen grid through capacitance 27. Since tube 26 is operated as a cathode follower, its cathode and control grid maintain substantially equal alternating-current potentials. Capacitance 27, therefore, in effect by-passes the screen grid to the cathode and all three electrodes, screen grid, control grid, and cathode, are maintained at substantially equal potentials with respect to alternating-current. The direct-current potential of the screen grid of tube 26 is made positive with respect to the cathode by the voltage dividing action of resistances 28 and 29, plate supply source 25 of tube 22 funishing the required direct current. Negative supply 30 also aids in this respect. It should be noted that for many applications, generalized impedances may be used in place of resistors 28 and 29. However, since resistances are more generally employed the term "resistance"

is used in the present description for the sake of simplicity. It may also be noted that for many applications direct-current power supply 30 is not absolutely necessary, since adequate potential difference between the screen and control grids is possible even with resistor 29 returned to ground.

Low frequency response of the circuit shown in Fig. 4 depends, to a considerable extent, upon the relative sizes of capacitance 27 and resistance 28. In general, the low frequency half-power point on the response curve occurs at the frequency where the reactance of condenser 27 is equal to the resistance of resistor 28. In other words, low frequency response is dependent upon the product of capacitance 27 and resistance 28.

In Fig. 3, it will be recalled, screen resistor 14 was limited in size by the amount of voltage drop appearing across it. In order to achieve a given low frequency response, then, screen by-pass condenser 18 had to be relatively large, making stray capacity to ground an important factor. In Fig. 4, on the other hand, only bleeder current, as differentiated from the direct-current component of the full screen current, flows through resistors 28 and 29. Therefore, their resistances may be made quite high, the only limiting factor generally being the recommendations of the manufacturer of tube 26 as to maximum grid resistance. Since resistance 28 may be made quite large, it follows that condenser 27 may be made correspondingly smaller in order to achieve the same low frequency response as was attained with the circuit of Fig. 3. Since condenser 27 may be made relatively small, both physically and electrically, the stray capacitance 20 in Fig. 3 has no counterpart in Fig. 4.

In Fig. 4 the screen-control grid capacitance 17 of tube 26 is of relatively little importance since capacitance 27 holds those elements at the same alternating-current potential. In many other respects, capacitance 27 serves essentially as an interstage coupling capacitance. It should finally be noted that direct-current transmission will be reduced somewhat by the loss due to the dividing action of resistances 28 and 29.

For purposes of illustration, a typical set of values for the circuit shown in Fig. 4 with an effective operating frequency range of from 16 cycles to 3.0 megacycles, is as follows:

| Reference No. | Description |
|---|---|
| 22 | Type 6AK5 vacuum tube. |
| 23 | −2 volt bias supply. |
| 24 | 15,000 ohms resistance. |
| 25 | +300 volt power supply. |
| 26 | Type 6AR6 vacuum tube. |
| 27 | .01 microfarad capacitance. |
| 28 | 1 megohm resistance. |
| 29 | 2 megohms resistance. |
| 30 | −300 volt power supply. |
| 31 | 10,000 ohms resistance. |
| 32 | −300 volt power supply (may be combined with 30). |
| 33 | +300 volt power supply (may be combined with 25). |

Figure 5:
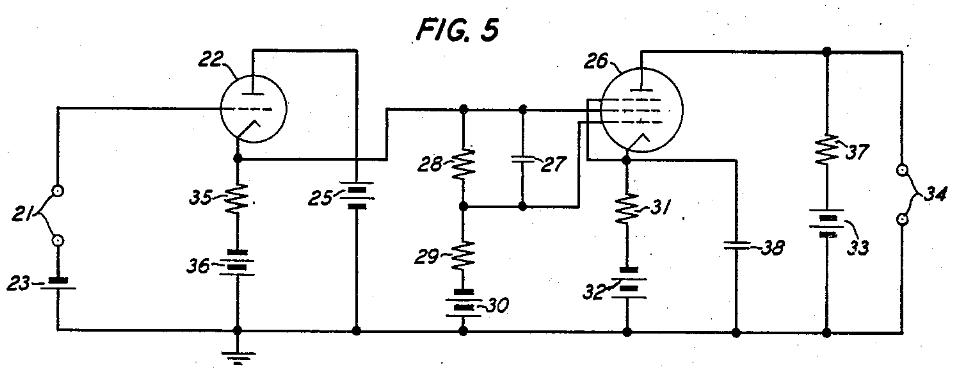
Fig. 5 shows the interstage network used in Fig. 4 as applied to a non-cathode follower circuit.

Fig. 5 illustrates the interstage circuit of Fig. 4 used to supply the screen and control grids of a conventionally operated pentode vacuum tube, where it still will enable some advantages to be secured. Similar reference numerals are used in Fig. 5 to denote circuit elements corresponding to those in Fig. 4. Only connections differing from those in Fig. 4 will be described.

In Fig. 5, the first tube 22 is a conventional triode vacuum tube amplifier, shown to be operated as a cathode follower. A resistance 35 and a negative direct-current power supply 36 are connected in series between the cathode of tube 22 and ground. Plate power supply 25 is connected directly between the plate of tube 22 and ground. In Fig. 5 the output of tube 22 is developed across cathode resistor 35, the cathode being coupled directly to the screen grid of pentode tube 26. A resistance 37 is added in series with the plate of tube 26 and plate power supply 33.

As a conventional pentode amplifier resistance 31 and power supply 32 could be omitted or, if direct-current operating stability is an important parameter, resistance 31 could be made large and by-passed for all operating frequencies by a capacitance 38. If the degenerate operation of a non-by-passed cathode resistance is desired, capacitance 38 may be omitted. Operation is, in general, similar to that described in connection with Fig. 4. The major difference is that in Fig. 5 tube 26 is not operated as a cathode follower and the cathode is, therefore, not maintained at the alternating-current potential of the screen and control grids.

Figure 6:
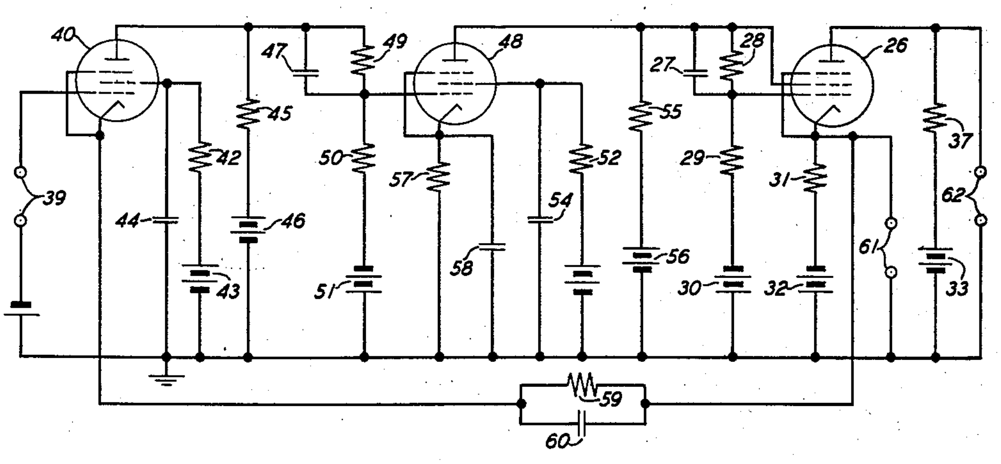
Fig. 6 illustrates a three-stage feedback amplifier utilizing the same interstage coupling network in connection with its output stage.

Fig. 6 shows a three-stage feedback amplifier which employs the present invention advantageously. Referring particularly to Fig. 6, there, one of a pair of input terminals 39 is connected to the control grid of a vacuum tube 40, which may be, for example, a pentode. The other terminal 39 is connected through a grid biasing battery to ground. The suppressor grid of tube 40 is connected to the cathode and the screen grid is fed in the conventional manner by a dropping resistor 42 in series with a direct-current power supply 43, connected between the screen grid and ground. A by-pass condenser 44 shunts the series combination of resistor 42 and power supply 43. A resistance 45 is connected between the plate of tube 40 and the positive side on a plate power supply 46, the negative side of which is grounded.

The output of tube 40 is fed to the second stage of the amplifier in the following manner. The plate of tube 40 is connected through a coupling condenser 47 to the control grid of a second pentode tube 48. Condenser 47 is shunted by a resistance 49 and a resistance 50 is connected between the control grid of tube 48 and the negative side of direct-current power supply 51. The positive side of power supply 51 is grounded. The suppressor grid of tube 48 is coupled directly to the cathode and the screen grid is, as was the screen of tube 40, fed in the conventional manner. A dropping resistor 52 and a positive direct-current power supply are connected in series between the screen of tube 48 and ground. A by-pass capacitance 54 shunts the series combination. A resistance 55 and a plate supply source 56 are connected in series between the plate of tube 48 and ground. A resistance 57 is situated between the cathode of tube 48 and ground and is shunted by a capacitance 58.

The output of tube 48 is transmitted to an output tube 26 through an interstage network similar to that described with reference to Figs. 4 and 5. Briefly, the plate of tube 48 is coupled directly to the screen grid of tube 26. A condenser 27 and a resistor 28 are in parallel between the screen and control grids, and a resistor 29 and a negative direct-current power supply 30 are in series between the control grid of tube 26 and ground. The suppressor grid of tube 26 is coupled to the cathode, and a resistor 31 and a negative direct-current supply 32 are connected in series between the cathode and ground.

A resistance 37 is connected between the plate of tube 26 and the positive side of a direct-current plate supply 33, the negative side of which is grounded. A negative feedback path comprising a resistance 59 shunted by a capacitance 60 is provided between the cathode of tube 26 and the cathode of tube 40. One pair of output terminals 61 is located between the cathode of tube 26 and ground, while a second pair 62 is situated between the plate of tube 26 and ground.

The network feeding the screen and control grids operates in much the same manner as does that described in connection with Figs. 4 and 5. The control grid potential of tube 26 is dropped via the resistance divider 28 and 29 so that the screen grid assumes the proper potential above the cathode. The plate supply 56 of tube 48 furnishes the necessary direct current. Capacitance 27 provides alternating-current coupling from the plate of tube 48 to the control grid of tube 26.

Either output circuit 61 or output circuit 62 may be used, but the advantages of cathode follower operation will be secured only if circuit 61 is employed. It should be noted that the feedback circuit linearizes the space current of tube 26, making the output voltage from terminals 61 a linear function of the input. The voltage across output terminals 62, however, is determined by the plate current. Therefore, linearity between input and output is preserved only to the extent that the screen current is a constant fraction of the plate current.

Although the invention has been described largely with reference to certain specific embodiments, various other embodiments and modifications, within the spirit and scope of the appended claims, will occur to those skilled in the art.

What is claimed is:

1. A wide band amplifier which comprises an amplifying device having at least an anode, a cathode, a control grid, and a screen grid, a signal input path for said device connected between one of said grids and said cathode, said signal input path including in serial relation a source of input signals and a signal utilization circuit with said signal utilization circuit adjacent said cathode, a space current path for said device connected between said anode and said cathode, said space current path including in serial relation a source of space current and said signal utilization circuit with said signal utilization circuit adjacent said cathode, said signal utilization circuit being common to both said signal input path and said space current path, whereby said device operates as a cathode follower, impedance means opaque to direct current connected between said control and screen grids to maintain them at substantially the same potential with respect to signal frequency current, and means to bias said control and screen grids to different potentials relative to said cathode, said last-mentioned means including a source of direct potential connected between said screen grid and the side of said signal utilization circuit away from said cathode, a first resistance direct-current path connected between said control grid and said screen grid, and a second resistive direct-current path connected between said control grid and said side of said signal utilization circuit away from said cathode.

2. A wide band amplifier which comprises an amplifying device having at least an anode, a cathode, a control grid, and a screen grid, a signal input path for said device connected between said screen grid and said cathode, said signal input path including in serial relation a source of input signals and a signal utilization circuit with said signal utilization circuit adjacent said cathode, a space current path for said device connected between said anode and said cathode, said space current path including in serial relation a source of space current and said signal utilization circuit with said signal utilization circuit adjacent said cathode, said signal utilization circuit being common to both said signal input path and said space current path, whereby said device operates as a cathode follower, impedance means opaque to direct current connected between said control and screen grids to maintain them at substantially the same potential with respect to signal frequency current, and means to bias said control and screen grids to different direct potentials relative to said cathode, said last-mentioned means including a source of direct potential connected between said screen grid and the side of said signal utilization circuit away from said cathode, a first resistive direct-current path connected between said control grid and said screen grid, and a second resistive direct-current path connected between said control grid and said side of said signal utilization circuit away from said cathode.

3. A wide band amplifier which comprises an amplifying device having at least an anode, a cathode, a control grid, and a screen grid, a signal input path for said device connected between said screen grid and said cathode, said signal input path including in serial relation a source of input signals and a load having first and second terminals with said load adjacent said cathode, said first terminal of said load being connected to said cathode, a space current path for said device connected between said anode and said cathode, said space current path including in serial relation a source of space current and said load with said load adjacent said cathode, said load being common to both said signal input path and said space current path, whereby said device operates as a cathode follower, a capacitor connected between said screen and control grids to maintain them at substantially the same potential with respect to signal frequency current, and means to bias said control and screen grids to different direct potentials relative to said cathode, said last-mentioned means including a source of direct potential connected between said screen grid and said second terminal of said load, a first resistive direct-current path connected between said control grid and said screen grid, and a second resistive direct-current path connected between said control grid and said second terminal of said load.

4. A wide band amplifier which comprises an amplifying device having at least an anode, a cathode, a control grid, and a screen grid, a signal input path for said device connected between said screen grid and said cathode, said signal input path including in serial relation a source of input signals, a source of direct potential, and a load having first and second terminals, said load being adjacent said cathode and said first terminal of said load being connected to said cathode, a space current path for said device connected between said anode and said cathode, said space current path including in serial relation a source of space current and said load with said load adjacent said cathode, said load being common to both said signal input path and said space current path, whereby said device operates as a cathode follower, a capacitor connected between said screen and control grids to maintain them at substantially the same potential with respect to signal frequency current, and means to bias said control and said screen grids to different direct potentials relative to said cathode from the said source of direct potential, said last-mentioned means including a first resistive direct-current path connected between said control and screen grids and a second resistive direct-current path connected between said control grid and said second terminal of said load.

5. A wide band amplifier which comprises a first amplifying device having at least an anode, a cathode and a control grid, a second amplifying device having at least an anode, a cathode, a control grid, and a screen grid, a source of input signals connected between the control grid and the cathode of said first device, a load resistance and a source of space current connected in serial relation between the anode and the cathode of said first device, a signal utilization circuit having first and second terminals, said first terminal of said signal utilization circuit being connected to the cathode of said second device, connections from the anode of said first device to the screen grid of said second device and from the cathode of said first device to said second terminal of said signal utilization circuit, a space current path for said second device connected between the anode and the cathode of said second device, said space current path including in serial relation a source of space current and said signal utilization circuit with said signal utilization circuit adjacent said cathode, impedance means opaque to direct current connected between the control and screen grids of said second device to maintain them at substantially the same potential with respect to signal frequency current, and means to bias the control and screen grids of said second device to different direct potentials relative to the cathode of said second device, said last-mentioned means including a first resistive direct-current path connected between the control and screen grids of said second device and a second resistive direct-current path connected between the control grid of said second device and said second terminal of said signal utilization circuit.

CHARLES W. HARRISON.

References Cited in the file of this patent

UNITED STATES PATENTS

| Number | Name | Date |
|---|---|---|
| 1,990,781 | Fitch | Feb. 12, 1935 |
| 2,052,986 | Nyman | Sept. 1, 1936 |
| 2,069,809 | Armstrong | Feb. 9, 1937 |
| 2,181,910 | Peterson | Dec. 5, 1939 |
| 2,319,139 | Koch | May 11, 1943 |
| 2,324,279 | Clark | July 13, 1943 |
| 2,330,109 | Brown | Sept. 21, 1943 |
| 2,335,050 | Fyler | Nov. 23, 1943 |
| 2,400,919 | Crawley | May 28, 1946 |
| 2,445,157 | Smith | July 13, 1948 |
| 2,494,317 | Seybold | Jan. 10, 1950 |